United States Patent [19]

Suzuki

[11] Patent Number: 5,568,024
[45] Date of Patent: Oct. 22, 1996

[54] DRIVE CONTROL SYSTEM AND METHOD FOR BATTERY CAR

[75] Inventor: Akira Suzuki, Nogi-Machi, Japan

[73] Assignee: Fuji Jukogyo Kabushiki Kaisha, Tokyo, Japan

[21] Appl. No.: 442,697

[22] Filed: May 17, 1995

[30] Foreign Application Priority Data

May 20, 1994 [JP] Japan .................................. 6-107071

[51] Int. Cl.$^6$ ......................................... B60L 15/20
[52] U.S. Cl. ........................................... 318/139; 318/430
[58] Field of Search .................................. 318/139, 375, 318/376, 430, 431, 739, 757, 759, 778, 801; 364/426.01

[56] References Cited

U.S. PATENT DOCUMENTS

| | | |
|---|---|---|
| 3,866,703 | 2/1975 | Eastham . |
| 4,217,529 | 8/1980 | Bourke et al. . |
| 4,730,151 | 3/1988 | Florey et al. ............... 318/376 |
| 4,908,553 | 3/1990 | Hoppie et al. ............... 318/382 |
| 4,961,042 | 10/1990 | Imaseki ........................ 318/758 |
| 5,467,275 | 11/1995 | Takamoto et al. ............ 318/587 X |

*Primary Examiner*—Bentsu Ro
*Attorney, Agent, or Firm*—Beveridge, DeGrandi, Weilacher & Young, L.L.P.

[57] ABSTRACT

Two motor sensors are disposed at two different angular positions of the motor to generate two pulse signals of different phases. The motor rotational speed and direction can be detected on the basis of these two pulse signals. The detected motor rotational direction is checked as to whether it is the same or opposite to that determined by the shift lever. If opposite, the battery car is determined to be being caused to move down on a sloping road, and the motor torque is corrected so that the battery car can be once stopped on condition that the accelerator pedal is slightly depressed. After that, when the accelerator pedal is further depressed and the accelerator pedal stroke reaches a stroke enough to generate a motor torque for starting the battery car on a sloping road, the ordinary drive control is executed. Therefore, the start and slow speed drive on a sloping road can be facilitated, without any skill, thus lightening the burden on the driver that the driver must depress both the accelerator and brake pedals frequently.

9 Claims, 6 Drawing Sheets

DRIVE CONTROL SYSTEM AND METHOD FOR BATTERY CAR

BACKGROUND OF THE INVENTION

1. Field of the Invention

The present invention relates to a drive control system for a battery car (electric automobile car) which can reduce burden on the driver at start and slow speed drive of the battery car, in particular on a sloping road.

2. Description of the Prior Art

In general, there are various types for driving a battery car, for instance such as to transmit a motor drive power directly to driving wheels via a reduction gear by making the best use of flat torque characteristics of a motor, or to mount a clutch and a manual transmission so that the battery car can be driven in the same way as a gasoline engine car. In conventional battery cars, however, fine or delicate accelerator pedal operation is particularly required from a start to a slow speed drive during which motor output torque is small, so that a burden has been cast upon the driver.

To overcome this problem, various methods have been so far proposed as follows: Japanese Laid-Open Patent Publication No. 62-217804 discloses such a technique that a forward/backward command signal for switching the vehicle drive direction from the forward to the backward or vice versa is inputted to a control unit as a motor directional signal indicative of the motor rotating direction whenever the number of revolution of the motor reaches zero, so that the motor starting operation can be smoothed.

Further, Japanese Laid-Open Utility Model Publication No. 1-86401 discloses a method wherein whenever the battery car is started, a current limit value (roughly proportional to the maximum torque) of the driving motor is increased to facilitate the start of the battery car.

Further, Japanese Laid-Open Patent Publication No. 3-253202 discloses such a technique that whenever the vehicle speed is reduced down roughly to zero, current of a predetermined rate is supplied from the battery to the driving motor to generate a small driving power for driving the driving wheel slightly so that both the repetitive accelerator and brake pedal depression can be omitted whenever the battery car is driven at slow speed in a traffic jam.

In the above-mentioned prior art methods, however, in the case of the battery car having no automatic transmission provided with a torque converter, there exists a problem in that the battery car is caused to move down due to deficiency of accelerator pedal depression or is started abruptly due to the reaction thereof when the battery car is started on a sloping road. Further, even in the case of a battery car having an automatic transmission provided with a torque converter, the battery car cannot perfectly follow the load fluctuations due to change in road gradient. On the other hand, there exists another problem in that the cost of the battery car inevitably increases.

SUMMARY OF THE INVENTION

With these problems in mind, therefore, it is an object of the present invention to provide a drive control system and method for a battery car which can facilitate the start and slow-speed drive on a sloping road, while improving the driving operation at slow speed drive on a flat road.

To achieve the above-mentioned object, a first aspect of the present invention provides a drive control system for a battery car driven by a motor and provided with an accelerator pedal, a brake pedal and a shift lever, which comprises: acceleration detecting means for detecting depression of the accelerator pedal and further depression rate of the depressed accelerator pedal; shift lever detecting means for detecting shift positions of the shift lever; motor rotational speed and direction detecting means for detecting motor rotational speed and motor rotational direction; and motor torque control means operative, upon the acceleration detecting means detecting that the depression rate of the acceleration pedal is less than a predetermined value and further upon the motor rotational speed and direction detecting means detecting that the motor rotational direction is opposite to a travel direction detected by the shift lever detecting means, for controlling the motor torque in such a way that the vehicle can be once stopped and then driven in accordance with ordinary drive torque determined according to the depression rate of the accelerator pedal.

Further, a second aspect of the present invention provides a drive control system which further comprises brake pedal detecting means for detecting depression of the brake pedal; and wherein when the motor rotational speed and direction detecting means detects that the motor speed is less than a predetermined value and further the rotational direction is the same as a travel direction detected by the shift lever detecting means and further when the acceleration detecting means and the brake pedal detecting means detect that the accelerator pedal and the brake pedal are both not depressed, the motor torque control means corrects the motor torque in such a way that the vehicle can be driven at a slow speed.

Further, a third aspect of the present invention provides a drive control system wherein when the motor rotational speed and direction detecting means detects that the motor speed is less than a predetermined value and further the rotational direction is opposite to a travel direction detected by the shift lever detecting means and further when the acceleration detecting means and the brake pedal detecting means detect that the accelerator pedal and the brake pedal are both not depressed, the motor torque control means corrects the motor torque in such a way that the vehicle can be once stopped.

Further, the motor rotational speed and direction detecting means comprises two sensors mounted at two different angular positions of the motor, for generating two pulse signals of two different phases, the motor rotational speed and direction being detected on the basis of the two pulse signals.

Further, the present invention provides a method of controlling a battery car driven by a motor and provided with an accelerator pedal, a brake pedal and a shift lever, which comprises the steps of: checking whether vehicle speed is lower than a predetermined value; checking whether the shift lever is shifted to a neutral range or a drive or reverse range; checking whether motor rotational direction is opposite to that determined by the shift lever; checking whether the accelerator pedal is depressed; checking whether an acceleration rate is smaller than a predetermined value; checking whether the battery car is stopped; changing motor torque to stop the battery car; checking whether the battery car is being caused to move down; repeating the step of checking again whether the acceleration rate is smaller than the predetermined value; and executing an ordinary drive control until an integrated torque-up rate becomes zero or negative.

In the first aspect of the present invention, when the vehicle travel direction is opposite to that determined by the shift lever and further the acceleration rate is less than a predetermined value, the vehicle drive torque is generated in such a way that the vehicle is once stopped on a sloping road and then driven in accordance with the ordinary drive torque determined according to the depression rate of the accelerator pedal.

Further, in the second aspect of the present invention, when the vehicle travel direction is the same as that determined by the shift lever and further the acceleration and brake pedals are not both depressed, the vehicle drive torque is generated in such a way that the vehicle can be driven at a slow speed on a flat road in a traffic snarl.

In the third aspect of the present invention, when the vehicle travel direction is opposite to that determined by the shift lever, and when the vehicle travel speed is less than a predetermined value and further the acceleration and brake pedals are both not depressed, the vehicle drive torque is generated in such a way that the vehicle is once stopped on a sloping road and then driven in accordance with the ordinary drive torque determined according to the depression rate of the accelerator pedal.

DESCRIPTION OF THE PREFERRED EMBODIMENTS

Preferred embodiments of the present invention will become understood from the following detailed description referring to the accompanying drawings.

Figure 1:
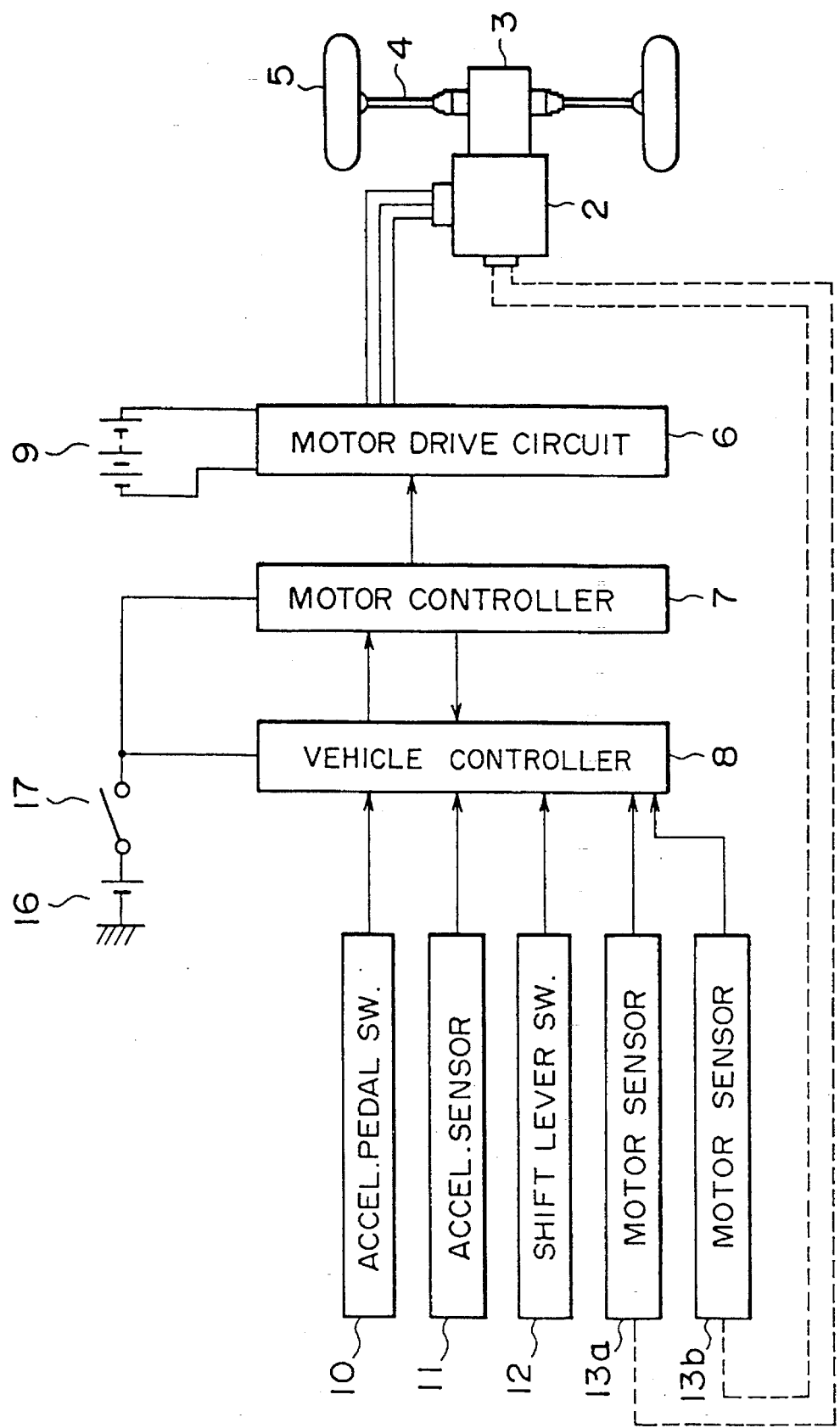
FIG. 1 is a system block diagram showing a first embodiment of the drive control system for a battery car according to the present invention.

FIGS. 1 to 7 show a first embodiment of the present invention. In FIG. 1, a battery car is provided with a driving motor (e.g., alternating current (AC) induction motor) 2. The driving motor 2 is connected to a trans-axle (a combination of a transmission and an axle in a front drive vehicle) 3 comprising a reduction gear and a differential gear. Further, driving power is transmitted from the driving motor 2 to front right and left wheels 5 via the trans-axle and front right and left wheel shafts 4.

The driving motor 2 is connected to a motor drive circuit (e.g., inverter) 6 for converting DC voltage supplied by a main battery 9 (the major power source for driving the vehicle) into voltage of a predetermined high frequency. Further, a motor controller (motor torque control means) 7 is connected to the motor drive circuit 6 to control the frequency, voltage, current (slip) of the driving motor 2.

Further, a vehicle controller (motor torque control means) 8 for outputting a motor torque command signal is connected to the motor controller 7. The motor controller 7 has a PWM (pulse width modulation) controller for outputting a PWM signal for controlling the frequency, voltage and current (slip) of the driving motor 2 on the basis of the torque command signal applied from the vehicle controller 8. The vehicle controller 8 is a microcomputer including a CPU, ROM, RAM, I/O interface, etc. all connected to each other via a bus (not shown). Further, an accelerator pedal switch (acceleration detecting means) 10, an acceleration rate sensor (acceleration rate detecting means) 11, a shift switch (shift lever detecting means) 12, first and second motor revolution sensors (motor rotational speed and direction detecting means) 13a and 13b, etc. are connected to the vehicle controller 8. The vehicle controller 8 receives the switch and sensor signals via the I/O interface, and processes the switch and sensor signals to output a torque control signal to the motor controller 7, so that the driving motor 2 can generate an appropriate torque according to the accelerator pedal depression rate.

Figure 2:
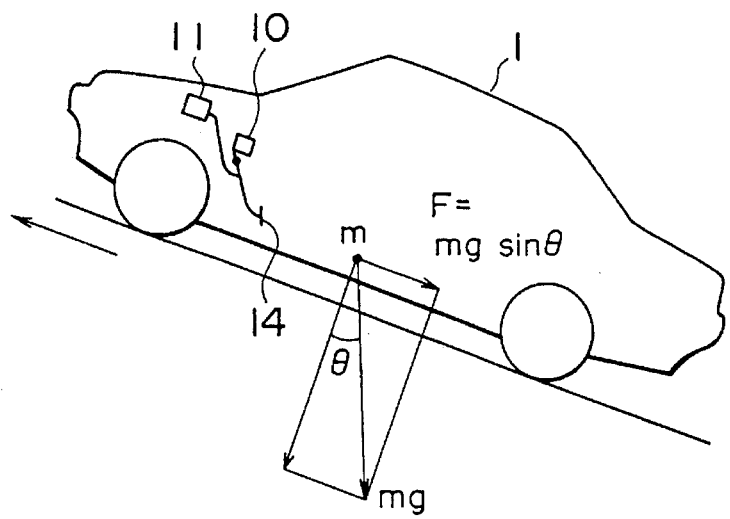
FIG. 2 is an illustration explaining a grade (climbing) resistance of a vehicle traveling on a sloping road.
Figure 3:
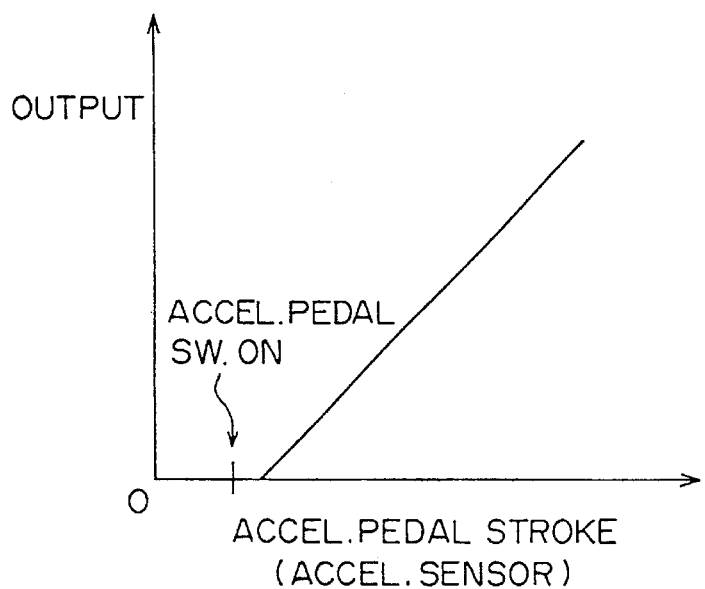
FIG. 3 is a graph showing output characteristics of an accelerator pedal switch and an acceleration rate sensor.

As shown in FIG. 2, the accelerator pedal switch 10 and the acceleration rate sensor 11 are both associated with an accelerator pedal 14 provided on a floor in front of a driver's seat of a battery car 1. Further, as depicted in FIG. 3, the accelerator pedal switch 10 is turned on when the accelerator pedal 14 is slightly depressed (at a small stroke), and the acceleration rate sensor 11 outputs an acceleration rate signal whose level is roughly proportional to the depression rate (stroke) of the accelerator pedal 14.

Figure 4:
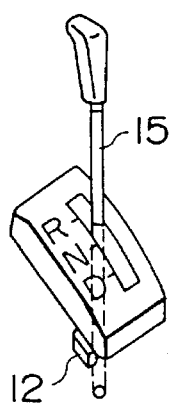
FIG. 4 is an illustration showing a shift lever and a shift switch.

Further, as shown in FIG. 4, the shift switch 12 is a shift lever position detecting switch provided on the base portion of a shift lever 15 to detect the respective shift positions of the shift lever 15 such as a N (neutral) range, a D (drive) range, and a R (reverse) range.

The first and second motor revolution sensors 13a and 13b are mounted on the driving motor 2 being spaced at a predetermined angular distance apart from each other to generate two pulse signals of two different phases. On the basis of these two-phase pulse signals, the vehicle controller 8 can detect the rotational speed (the number of revolutions) and direction of the motor 2.

With reference to FIG. 1 again, a subsidiary battery 16 is provided and connected to the motor controller 7 and the vehicle controller 8 via a key switch 17. Therefore, when the key switch 17 is turned on, a control voltage is supplied from the subsidiary battery 16 to the motor controller 7 and the vehicle controller 8, respectively to activate the drive control system according to the present invention. Here, the vehicle controller 8 functions as torque controlling means for controlling the output torque of the driving motor 2 by executing a program for motor torque control processing (to be described later), and outputs a torque-up or -down command (speed command) signal to the motor controller 7 to control the torque of the driving motor 2.

Figure 5:
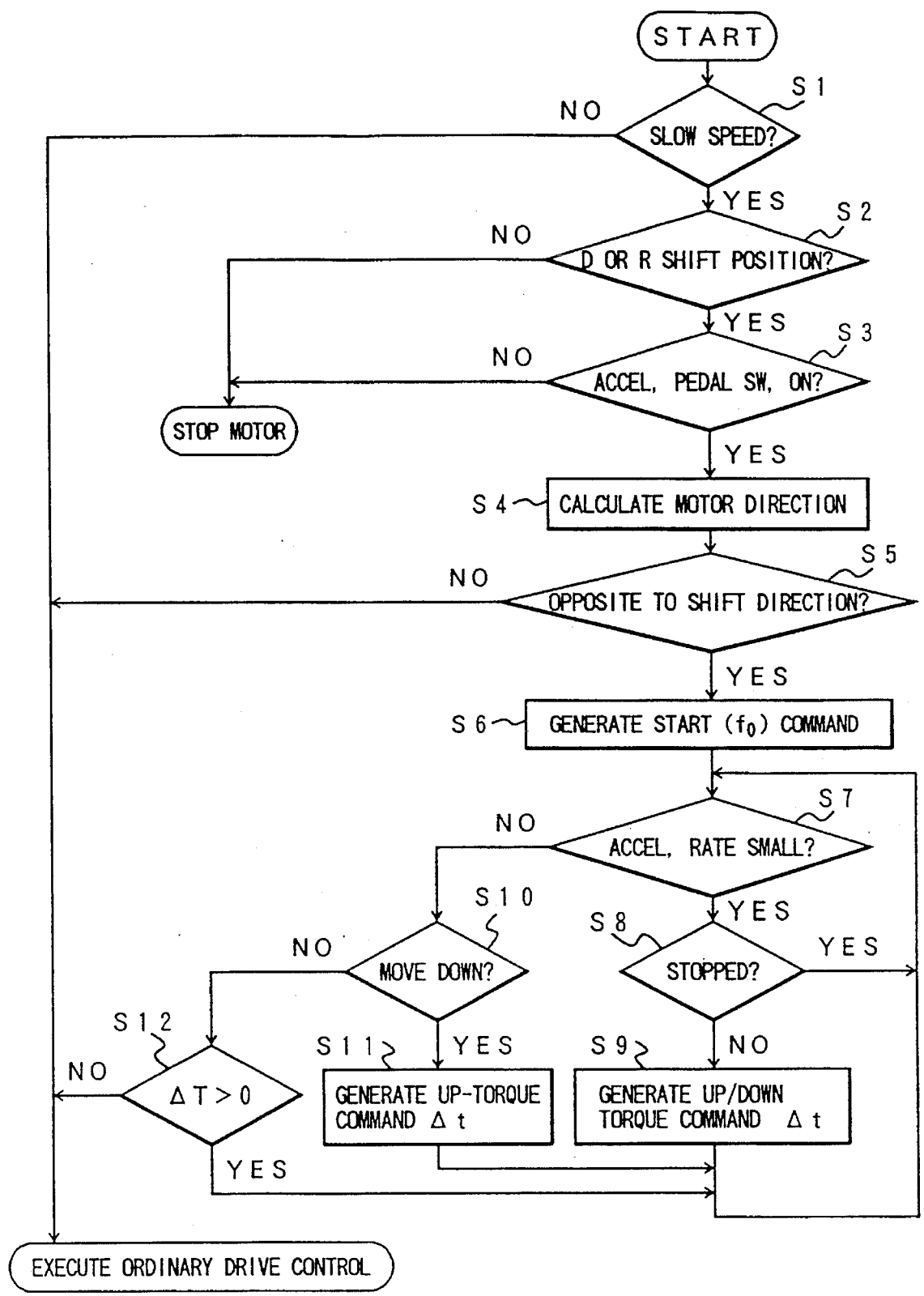
FIG. 5 is a flowchart showing a motor torque control processing in the first embodiment shown in FIG. 1.

With reference to FIG. 5, the torque control processing of the driving motor 2 by the vehicle controller 8 will be described below.

Upon start of the program, the microcomputer of the vehicle controller 8 (referred to as the control, hereinafter) checks whether the battery car 1 is at halt or driven at a slow speed (in step S1). If NO, the control executes the ordinary drive control. If YES, the control proceeds to step S2 and checks whether the shift lever position is at the D or R (i.e., drive) range on the basis of the signal applied by the shift switch 12 (in step S2). If NO; that is, if at the N range, control stops the motor 2 and skips the program. If YES; that is, if at the D or R (drive) range, the control proceeds to step S3.

The control checks whether the accelerator pedal switch 10 is turned on; that is, whether the driver is depressing the accelerator pedal 14 (in step S3). If NO; that is, if the driver's foot is kept away from the accelerator pedal 14 and thereby the accelerator pedal switch 10 is turned off, the control stops the motor 2 and skips the program. If YES; that is, if the accelerator pedal switch 10 is being depressed, the control proceeds to step S4, and calculates the rotational direction of the motor 2 on the basis of the two different-phase signals detected by the first and second motor revolution sensors 13a and 13b (in step S4). Further, the control checks whether the rotational direction of the motor 2 is opposite to that determined by the shift position of the shift lever 15 (in step S5).

In NO; that is, if the motor 2 is rotating correctly in the direction determined by the shift lever (e.g., if the motor is rotating in the forward direction in the D range or in the rearward direction in the R range), the control is shifted from step S5 to execute the ordinary drive control. If YES; that is, if the motor 2 is rotating in the direction opposite to that determined by the shift lever, the control decides that the vehicle is now being caused to move down on a sloping road, and outputs a starting ($f_0$) command signal (indicative of the starting magnetic field frequency $f_0$) to the motor controller 7 (in step S6), proceeding to step S7.

Further, the control checks whether the acceleration signal level of the acceleration rate sensor 11 is null or low and thereby the accelerator pedal depression rate is less than a predetermined set value (in step S7). If YES, the control checks whether the motor slip S is roughly 1 (S≈1), that is, in a constrained stop status (See FIG. 6) (in step S8). If YES, the control returns to step S7 and repeats steps S7 and S8. If NO, the control proceeds to step S9 to output a torque-up or -down correction command signal to increase or decrease the motor torque to stop the battery car 1, returning to step S7.

Here, as shown in FIG. 2, the move-down force (drive resistance) F of the battery car 1 on a sloping road can be expressed as $$F = mg \sin \theta$$

where m denotes the weight of the battery car 1 and thereby the motor torque TS for preventing the battery car 1 from moving down can be given as $$TS = F \cdot R / i$$

where R denotes the effective radius of the vehicle tires and i denotes the reduction ratio.

On the other hand, since the slip S of the induction motor 2 can be expressed as $$S = (ns - n)/ns$$

where ns denotes the number of revolutions of the rotating magnetic field of the stator (i.e., synchronous revolution speed) and n denotes the number of revolutions of the rotor, the torque T generated by the motor 2 can be obtained as $$PM/\omega \quad (\omega = 2\pi n/60)$$

where PM denotes the secondary output (mechanical power output) which is the function with respect to the motor voltage V; and ω denotes the angular velocity of the rotor.

Figure 6:
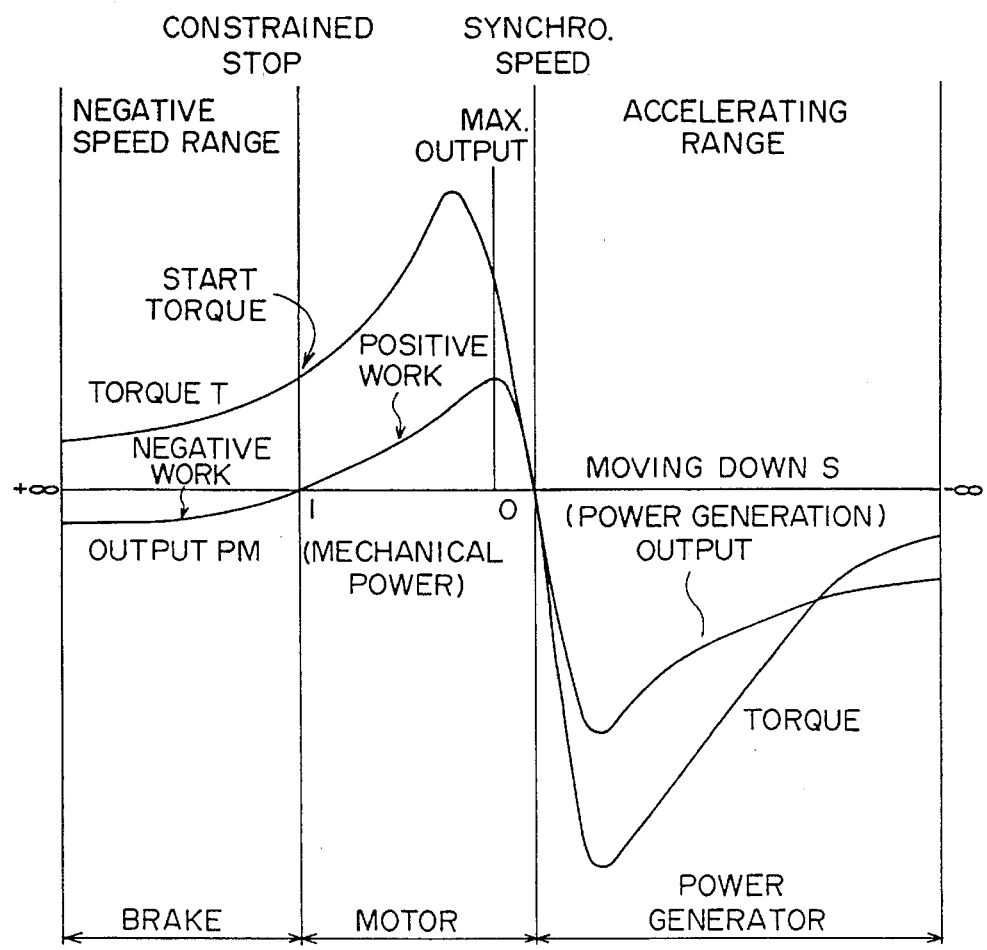
FIG. 6 is a graph showing motor characteristics.

Therefore, as shown in FIG. 6, the range where $0 \leq S \leq 1$ (the middle range) represents the state where the motor is rotating under the normal condition; the range where S>1 (the left side) represents the state where the motor is generating a torque in the same direction as that of the motor command but rotating in a direction opposite to that of the motor (operating as brake); and the range where S<0 (the right side) represents the state where the motor is rotating as an electric generator (dynamo).

Accordingly, if the motor torque T generated at the starting magnetic field frequency $f_0$ in step S6 is less than TS (T<TS), this indicates that the vehicle is moving down and thereby the number of revolutions of the rotor of the motor 2 is negative within a brake operation range of S>1. Therefore, under the condition that the accelerator pedal 14 is kept slightly depressed, the control repeats a loop of steps S7 to S9 to correct the frequency, voltage and current (slip) of the motor 2, so that the relationship T=TS can be established finally. As a result, it is possible to keep the vehicle at rest under the restrained stop status, in which the motor rotor is balanced with the move-down force and thereby S=1 (n=0).

After that, when the accelerator pedal 14 is further depressed, and thereby the depression rate of the accelerator pedal 14 exceeds a predetermined set value, the control branches from step S7 to step S10, and checks whether the vehicle is now moving down (in step S10). If YES, the control changes the frequency, voltage and current (slip) of the motor 2, and outputs a command signal for increasing the torque by a unit torque-up rate Δt, returning to step S7.

On the other hand, if NO; that is, if the vehicle is not moving down (in step S10), the control proceeds to step S12 to check whether the total corrected torque-up rate ΔT (ΣΔt) (an integration of the unit torque-up rate Δt) is larger than zero. If ΔT>0, the control returns to step S7 to repeat the above-mentioned steps from S7 to S11. If ΔT≤0, however, the control proceeds to step S12 to execute the ordinary drive control.

Figure 7:
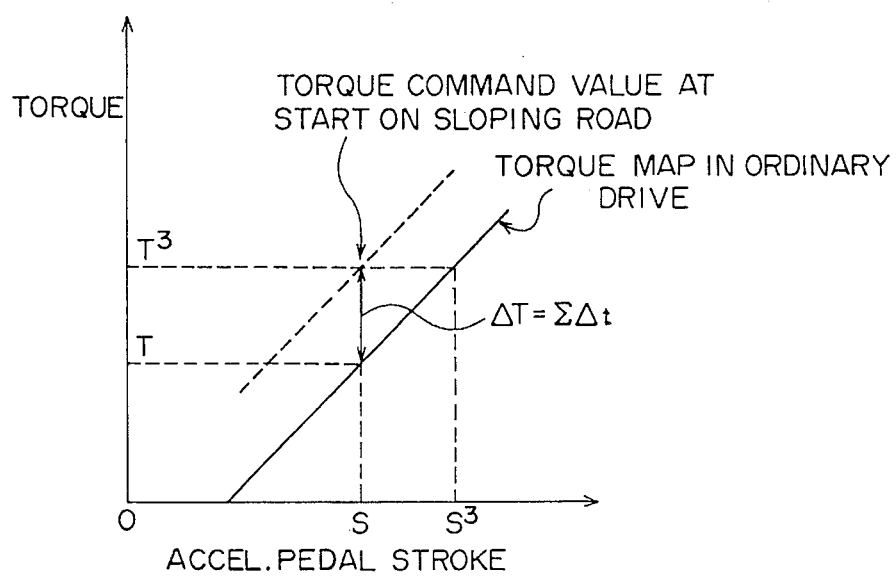
FIG. 7 is a graph showing the relationship between the accelerator pedal stroke and the motor output torque.

The steps from S7 to S12 will be explained in further detail with reference to FIG. 7. As shown in FIG. 7, the unit torque-up rates Δt are stepwise added to the basic torque T determined according to the accelerator pedal stroke S under the ordinary drive control (which is previously stored in the vehicle controller 8 as a map). As a result, it is possible to correct the basic torque T at the pedal stroke S under the ordinary drive control up to the torque T' required at the start on a sloping road. Further, after the accelerator pedal is further depressed in step S7 and thereby the accelerator pedal stroke S reaches the pedal stroke S' that produces the same basic torque as the corrected torque T' required at the start on a sloping road, the drive control is returned to the ordinary drive torque control.

As described above, in the drive control operation according to the present invention, it is possible to start the vehicle on a sloping road smoothly without needing any skill of the driver. In other words, it is possible to prevent the vehicle from being caused to move down on a sloping road due to deficiency of acceleration pedal depression rate or from being started abruptly due to the reaction thereof, thus lightening the burden upon the driver such that the driver must depress the accelerator pedal and brake pedal frequently.

Figure 8:
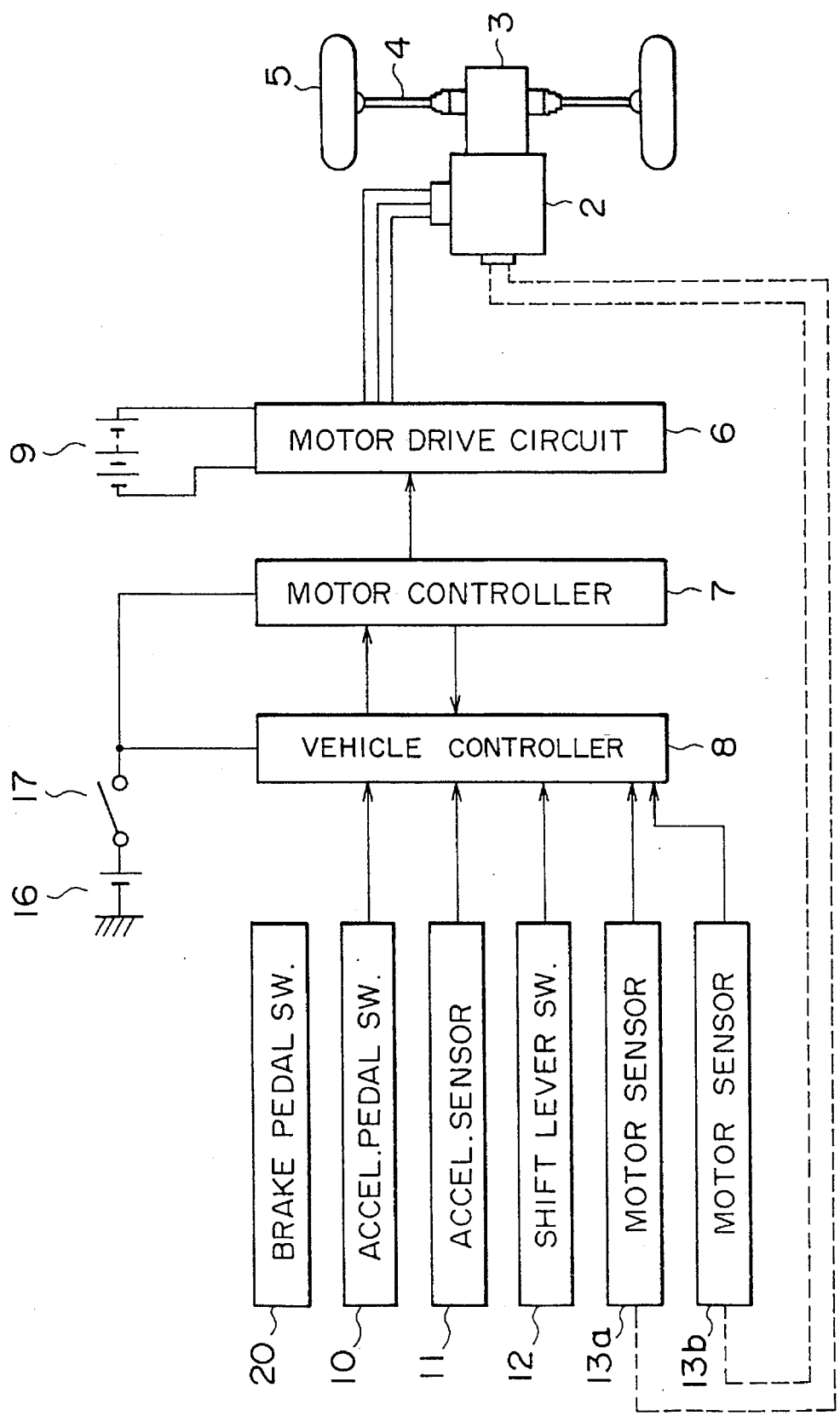
FIG. 8 is a circuit block diagram showing a second embodiment of the drive control system for a battery car according to the present invention.
Figure 9:
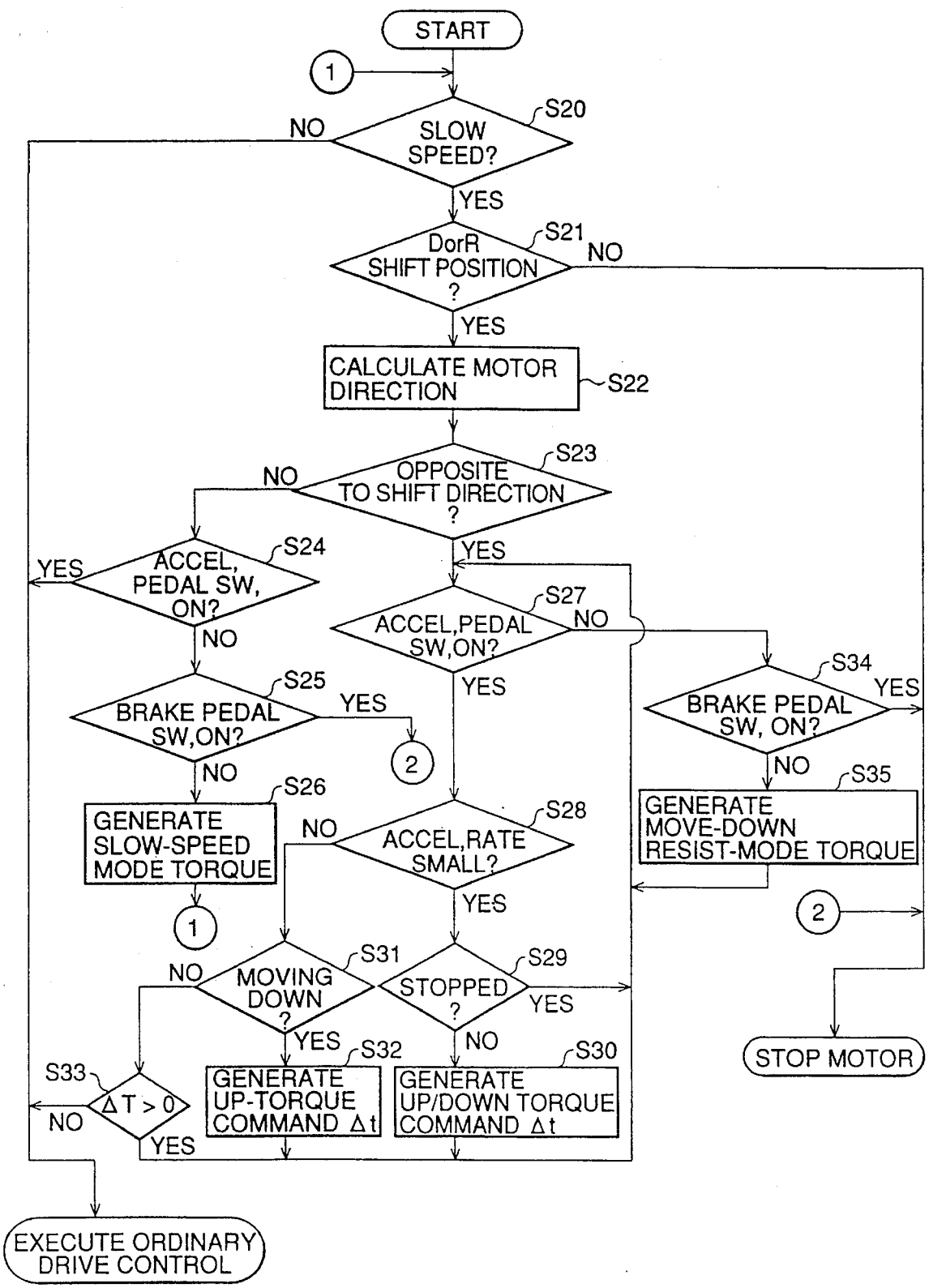
FIG. 9 is a flowchart showing the motor torque control processing in the second embodiment shown in FIG. 8.

FIGS. 8 to 9 show a second embodiment of the present invention. In the second embodiment, the motor torque control function is further expanded so that the driving operation can be improved in a slow speed drive on a flat road, in addition to the start on a sloping road.

As shown in FIG. 8, a brake pedal switch (brake pedal detecting means) 20 associated with a brake pedal (not shown) is additionally connected to the vehicle controller 8. The configuration other than the above is basically the same as that of the first embodiment, so that the same reference numerals have been retained for similar elements which have the same functions as the case of the first embodiment thereof, without repeating detailed description thereof.

In the motor torque control processing of the second embodiment, upon start of the program, the microcomputer of the vehicle controller 8 (referred to as the control, hereinafter) checks whether the vehicle is at halt or driven at a slow speed on the basis of the signals of the motor revolution sensors 13a and 13b (in step S20). If NO; that is, the vehicle speed is beyond a predetermined value, the control proceeds to the ordinary drive control. If YES in step S20, the control proceeds to step S21 and checks whether the shift lever position is at the D or R range on the basis of the signal applied by the shift switch 12 (in step S21). If NO; that is, if at the N range, the control stops the motor 2 and skips the program. If YES; that is, if at the D or R range, the control proceeds to step S22, and calculates the rotational direction of the motor 2 on the basis of the two different-phase pulse signals detected by the first and second motor revolution sensors 13a and 13b (in step S22). Further, the control checks whether the rotational direction of the motor 2 is opposite to that determined by the shift position of the shift lever 15 (in step S23). If NO; that is, if the motor 2 is rotating correctly in the direction determined by the shift lever, the control proceeds to the step S24 and the succeeding steps. If YES; that is, if the motor 2 is rotating in the direction opposite to that determined by the shift lever, the control decides that the vehicle is now being caused to move down on a sloping road, and proceeds to step S27 and the succeeding steps.

In steps S24 and the succeeding steps, the control checks whether the accelerator pedal switch 10 is turned on; that is, whether the driver is depressing the accelerator pedal 14 (in step S24). If YES; that is, if the driver steps on the accelerator pedal 14 and thereby the accelerator pedal switch 10 is turned on, the controls executes the ordinary drive control. If NO; that is, the accelerator pedal switch 14 is turned off, the control further checks whether the brake pedal switch 20 is turned on (in step S25).

As a result, if YES; that is, if the brake switch 20 is turned on so that the brake pedal is depressed, the control stops the motor 2 and skips the program. If NO; that is, if the accelerator pedal switch 10 and the brake pedal switch 20 are both turned off (both not depressed), the control proceeds from step S25 to step S26 and outputs a command signal indicative of a slow speed mode (in which a small torque is kept generated) to the motor controller 7, returning to step S20.

In this slow speed mode, the vehicle is driven at a slow speed equal to or less than a slow speed caused by the creep phenomenon in the case of an automatic transmission using a hydraulic converter, so that it is possible to lighten the burden (frequent vehicle start and stop operation) upon the driver when traveling on a flat road at a slow speed in a traffic jam.

On the other hands, if YES; that is, if the motor 2 is rotating in the direction opposite to that determined by the shift lever (in step S23), the control proceeds to steps S27 and the succeeding steps. That is, the control first checks whether the accelerator pedal switch 10 is turned on (in step S27). If YES; that is, if on, the control executes steps S28 to S33 (which are the same as those steps S6 to S12 in FIG. 5) to facilitate the start of the vehicle on a sloping road. If NO; that is, if at an off state, the control proceeds from step S27 to step S34 to check whether the brake pedal switch 20 is turned on (in step S34).

If YES; that is, if on, the control stops the motor 2 and skips the program. However, if NO; that is, if at the off state, the control decides that the vehicle is being caused to move down on a sloping road. In other words, when the accelerator pedal switch 10 and the brake pedal switch 20 are both turned off, the control proceeds from step S34 to step S35, and sets the control mode to a move-down resistance mode, so that a command signal for generating a small torque is outputted to the motor controller 7 to prevent the vehicle from being caused to move down on the sloping road. After that, the control returns to the step S27.

In the above-mentioned control loop from the steps S27 to S35, even if a small torque is generated in the move-down resistance mode, when the vehicle is still being caused to move down on a steep sloping road, so that the driver depresses the accelerator pedal slightly, the control executes the steps from S28 to S33, to facilitate the start on the steep sloping road.

In the above-mentioned embodiments, an AC induction motor has been described as the vehicle driving motor 2, without being limited only thereto, the present invention can be applied to an AC synchronous motor or a DC motor. Further, an acceleration rate signal can be used, instead of the acceleration pedal switch signal.

As described above, in the drive control system for a battery car according to the present invention, the output torque of the driving motor is corrected on the basis of whether the motor revolution direction matches the direction decided by the transmission shift lever, whereby even in the case of the battery car provided with no automatic transmission, it is possible to facilitate the start or slow-speed drive of the battery car on a sloping road, as well as to improve the driving operation at a slow speed on a flat road, thus lightening the burden upon the driver such that the driver must depress the acceleration and brake pedals frequently.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A drive control system for a battery car driven by a motor and provided with an accelerator pedal, a brake pedal and a shift lever, comprising:

acceleration detecting means for detecting a depression degree of the accelerator pedal and further an acceleration rate of the depressed accelerator pedal and for generating a depression degree signal;

shift lever detecting means for detecting a shift position of the shift lever and for generating a shift position signal;

motor rotational speed and direction detecting means for detecting a motor rotational speed and a motor rotational direction for generating a motor rotational direction signal; and motor torque control means having first means responsive to said depression degree signal for operation to decide whether the depression degree of the accelerator pedal is less than a predetermined value, said motor torque control means further having second means responsive to said shift position signal and said motor rotational direction signal for operation to judge whether the motor rotational direction is opposite to a travel direction represented by said shift position signal, said motor torque control means, upon the operation of said first and second means, controlling the motor torque in such a way that the vehicle can be once stopped and then driven in accordance with ordinary drive torque determined according to the depression rate of the accelerator pedal so as to improve the driveability of the battery car on a sloping road.

2. The drive control system for a battery car according to claim 1, further comprising:

brake pedal detecting means for detecting depression of the brake pedal; and wherein when said motor rotational speed and direction detecting means detects whether the motor speed is less than a predetermined value and further the rotational direction is the same as a travel direction detected by said shift lever detecting means and further when said acceleration detecting means and said brake pedal detecting means detect whether the accelerator pedal and the brake pedal are both free from depression, said motor torque control means corrects the motor torque in such a way that the vehicle can be driven at a slow speed.

3. The drive control system for a battery car according to claim 2, wherein:

when said motor rotational speed and direction detecting means detects whether the motor speed is less than a predetermined value and further the rotational direction is opposite to a travel direction detected by said shift lever detecting means and further when said acceleration detecting means and said brake pedal detecting means detect whether the accelerator pedal and the brake pedal are both free from depression, said motor torque control means corrects the motor torque in such a way that the vehicle can be once stopped.

4. The drive control system for a battery car according to claim 1, wherein:

said motor rotational speed and direction detecting means comprises two sensors mounted at two different angular positions of the motor, for generating two pulse signals of two different phases, the motor rotational speed and direction being detected on the basis of these two pulse signals.

5. A method of controlling a battery car driven by a motor and provided with an accelerator pedal, a brake pedal and a shift lever, comprising the steps of:

checking whether a vehicle speed is lower than a predetermined value;

checking whether the shift lever is shifted to an operational range other than a neutral range;

checking whether a motor rotational direction is opposite to that determined by the shift lever;

checking whether the accelerator pedal is depressed;

checking whether an acceleration rate is smaller than a predetermined value;

checking whether the battery car is stopped;

changing a motor torque to stop the battery car;

checking whether the battery car is being caused to move down;

repeating the step of checking again whether the acceleration rate is smaller than the predetermined value; and executing an ordinary drive control, until an integrated torque-up rate becomes zero or negative so as to stop the battery car.

6. The method of controlling a battery car according to claim 5, further comprising the steps of:

checking whether the accelerator pedal is free from depression;

checking whether the brake pedal is free from depression; and generating a motor torque so that the battery car can be driven at a slow speed, returning to the step of checking whether vehicle speed is lower than a predetermined value.

7. The method of controlling a battery car according to claim 5, further comprising the steps of:

checking whether the brake pedal is free from depression;

generating a motor torque so that the battery car can be once stopped; and returning to the step of checking whether the accelerator pedal is depressed.

8. The method of controlling a battery car according to claim 6, further comprising the step of:

stopping the motor when the accelerator pedal is free from depression and when the brake pedal is depressed.

9. The method of controlling a battery car according to claim 7, further comprising the step of:

stopping the motor when the accelerator pedal is free from depression and when the brake pedal is depressed.

* * * * *